Dec. 23, 1952     I. E. COFFEY     2,622,842
VALVE DEVICE
Original Filed May 18, 1944
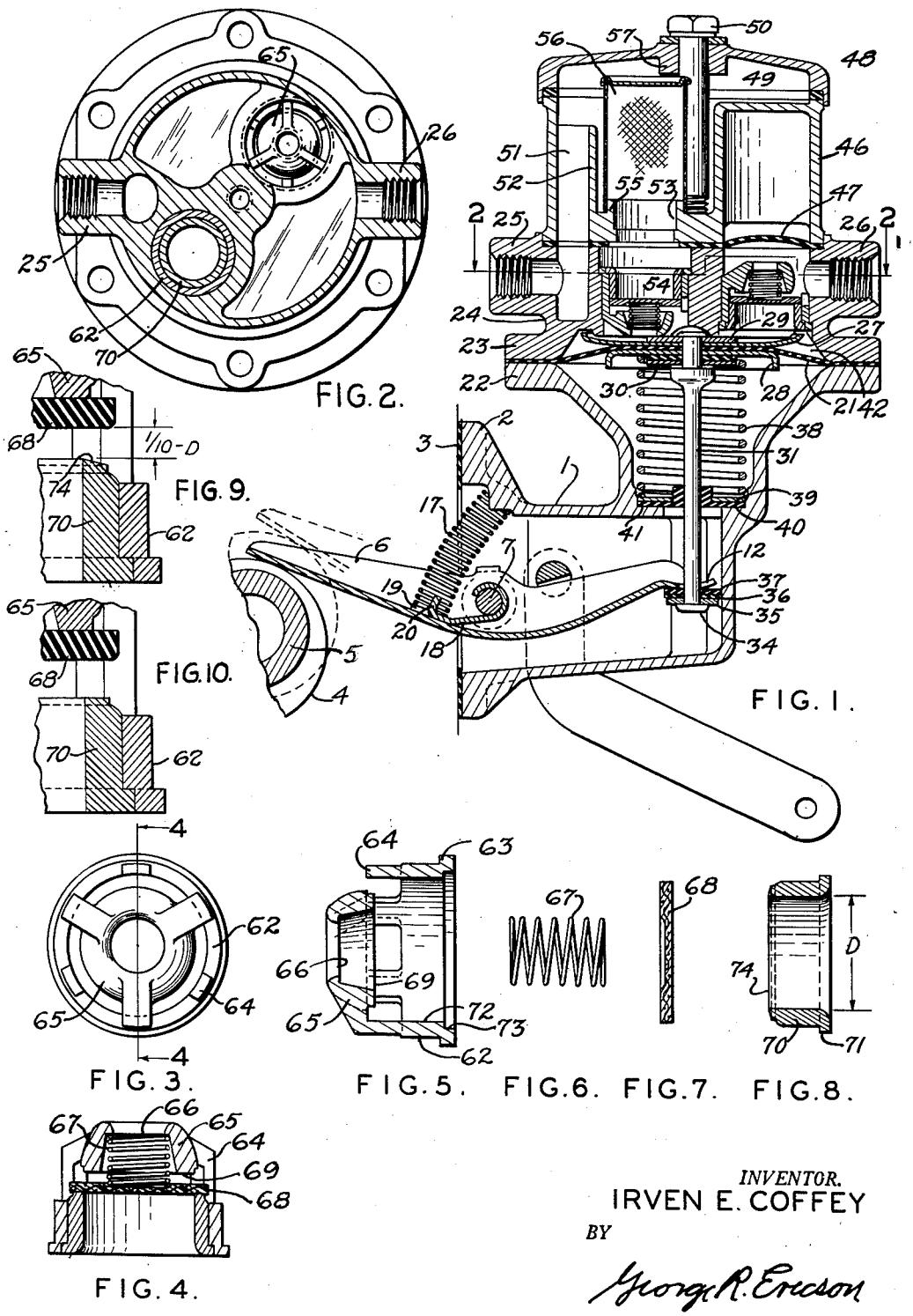
INVENTOR.
IRVEN E. COFFEY
BY
George R. Ericson Patented Dec. 23, 1952

2,622,842

UNITED STATES PATENT OFFICE 2,622,842

VALVE DEVICE

Irven E. Coffey, Normandy, Mo., assignor to Carter Carburetor Corporation, St. Louis, Mo., a corporation of Missouri Original application May 18, 1944, Serial No. 536,162, now Patent No. 2,426,965. Divided and this application August 13, 1945, Serial No. 610,526

1 Claim. (Cl. 251—144)

This invention relates to valve devices particularly of the type used in liquid pumps such as automotive fuel pumps. The valves used in previous fuel pumps have not been entirely satisfactory, for instance, because of their inability to handle fuel at high temperatures. This is a division of my application Serial No. 536,162, filed May 18, 1944, now Patent No. 2,426,965.

Another frequent source of trouble has arisen from wearing of the valves and valve seats so that the pump will not prime itself at cranking speed. When operating at two thousand cycles per minute, the inlet and outlet valves of a fuel pump have to be opened and closed with great rapidity, and this is especially hard on the inlet valve and seat, because its operation of opening and closing must be accomplished in a very small portion of the cycle, when the pump is operating at normal speed and capacity.

An object of the present invention is to provide a new and improved valve device of the above type capable of functioning satisfactorily with boiling fuel.

Another object is to produce a valve device capable of maintaining high sealing qualities after long use under high speed operating conditions.

These objects and other more detailed objects hereafter appearing are attained substantially by the device illustrated in the accompanying drawings in which Fig. 1 is a sectional elevation of an automotive fuel pump and embodying the novel valve device.

Fig. 2 is a sectional plan view taken along the irregular section line 2—2 of Fig. 1.

Fig. 3 is a plan view of the valve cage.

Fig. 4 is a sectional elevation of the valve assembly.

Fig. 5 is a sectional view taken on line 5—5 of Fig. 3.

Fig. 6 shows the valve spring.

Fig. 7 is a sectional view of the valve.

Fig. 8 is a sectional view of the valve seat member.

First, with reference to the pump assembly in Fig. 1, the numeral 1 shows a main casting having a flange 2, by means of which it is bolted on to the frame of the engine as at 3. It will be understood that while the pump is primarily designed for automotive engines, it is capable of other uses and can be attached to any support so as to be properly positioned with respect to a cam 4 carried by a rotating shaft 5 which preferably turns in a clockwise direction, so that the sweep of the cam will be inward with respect to the hammer or operating lever 6, which is pivotally mounted on the body member 1 by means of the floating pivot shaft 7. One end of the lever rides on the cam, as indicated, and the other is provided with a fork or hammer head 12 which is slightly curved. The lever is yieldably urged in an anti-clockwise direction by the spring 17, which is seated against flange 2, and seating member 18 which is mounted on shaft 7 and provided with a seating fork 19 and an upturned locating member 20. This detail is covered in my Patent No. 2,369,535.

Pump diaphragm 21 is held in place between flange 22 on the main casting and a corresponding flange 23 on valve body 24, which is provided with inlet and outlet connections 25 and 26, respectively. The diaphragm is clamped in position between the flanges, which are held together by any suitable means, such as bolts or rivets (not shown). The center portion of the pump diaphragm is rigidly held between upper and lower washers 27 and 28, respectively, which are, in turn, clamped between washers 29 and 30 riveted on to the shaft 31.

Shaft 31 is provided with a head 34 against which is seated a metal washer 35. A cushion washer 36 of pliable, but only slightly flexible, material is positioned next to the metal washer, and a third washer 37 is made of hard plastic material. A spring 38 having sufficient strength to move the diaphragm in one direction is mounted against washer 39 and against a metallic washer 39 which rests on sealing washer 40 slidably or snugly fitted to shaft 31. Sealing washer 40 is mounted in seat 41 in the main casting. When mounted as shown in Figure 1, the strength of spring 38 acting against diaphragm 21 has sufficient force to produce the pressure in the pumping chamber 42 which the pump is desired to maintain.

A main air dome casting 46 is mounted on a diaphragm 47 against a seat in the side of valve body 24. A cover member 48 containing a portion of the inlet air dome space 49 is held in position by the screw 50 which is threaded into the valve body to clamp the cover and the air dome in place. The inlet passage 51 extends into the valve body and up into the air dome in which it is surrounded by a baffle 52 which extends to a point substantially higher than the passage 53 leading to the inlet valve 54. Passage 53 is provided with an upstanding flange 55 over which is fitted the strainer 56, the latter being held in position by boss 57 which extends inwardly from the top of cover 48.

The construction of the valves has an important bearing on the life and operation of the pump. The design of the inlet valve according to my invention is more critical than the design of the outlet valve, because it has to operate at a much higher rate of speed, and also because it is required to perform a restricting function which will be described later. For convenience, I have made the exhaust valve identical with the inlet valve.

The valve comprises a cage 62 having a shoulder 63 which can be seated in corresponding bores formed in the die cast valve body. Struts 64 extend upwardly from the body member, and some or all of these struts are integrally connected with an annular spring seat in a ring shaped stop member 65, as shown in Figures 5 to 7. A shoulder 66 is formed in the member 65 to receive the spring 67 which normally holds the valve 68 in closed position. The stop portion 69 must be accurately and smoothly finished parallel to the valve 68 and also positioned in such a manner as to definitely limit the opening movement of the valve to a position substantially less than that which would be required to fully clear the passageway through the valve. The valve cage 62 is preferably formed of die cast material.

The valve seat member 70 has a shoulder 71 and is press-fitted into the bore 72 of the valve cage and firmly pushed up against the shoulder 73. A seat portion 74 of slightly conical shape, as indicated in Figure 8, is formed at the end of the valve seat member, and this is carefully lapped to a substantial line contact against the valve 68. This valve is preferably formed of Bakelite or other hard plastic material on a cloth base which is very light so as to move with very little inertia and strike the seat 74 and stop 69 with very little kinetic energy.

Disk valves of the general type shown herein have been previously used, but they have not been satisfactory in regard to wearing quality, as well as for other reasons. To the ordinary observer, a disk valve made of Bakelite and lightly seated by a small spring against a metal seat seems to present minimum possibilities for wear. There appears to be no rubbing between the valve and the seat. Even if rapidly operated, the small inertia of the valve should not apparently do any damage to the seat or to the valve stop.

In actual practice, previous valves have been subject to rapid wear and have actually worn out the seats and cages without any apparent reason. I have discovered that because of this, the valve cage and spring wear rapidly which causes or permits the valve to assume a slightly angular position with respect to the seat or stop during its opening or closing movement. If this occurs during the movement of the valve from one position to the other, it does not strike dead and flat, but strikes with a gyrating movement, the same as when a coin is dropped on a table. During this movement, there is a definite rubbing between the valve and seat which is probably the cause of the surprising amount of wear which has occurred in previous valves of this type. By carefully centering the disk with respect to the valve seat and the spring with respect to the valve and making the seats and stops absolutely parallel when new, I have substantially eliminated this cause of wear on the valves.

A feature of the invention is that the stop 69 is made circular, so that any wear on the valve is distributed on an annular surface. In this way, I avoid throwing the valve slightly out of parallelism with the seat, which would otherwise result from a slight turning of the valve.

Another important feature of the invention is the limitation of the movement of the valves. The movement of the valves between the seat and stop occurs with considerable violence, and I have discovered that by snubbing or limiting this movement, the life of the valves and diaphragm can be substantially increased. In order to hold the end of the spring 67 in fixed position with respect to the valve to prevent wear, I counterbore the valve, as indicated at 75. This counterbore may be made of such a diameter as to snugly fit the end of the spring, but good results may also be obtained by making the shoulders of the counterbore with a radius or chamfer so as to centralize the spring with respect to the valve.

I have found that the movement of the valve between the seat and stop tends to occur with great violence, and that the valve should be made as light as possible, so that it will strike the seat and stop with minimum inertia. In order to keep the valve flat and straight, it must have a thickness of at least $3/64''$ at the rim, but by counterboring it, as shown, the diameter of the center can be reduced to approximately $\frac{1}{32}''$ or even less. The material used in making the valve should be as light as possible, and I have found that a hard plastic on a cloth base, such as Celleron, Formica, Micarta, or Spauldite, may be used with satisfactory results.

In designing the valve, I have discovered that it is important for a number of reasons to limit the opening movement, and I prefer to make the space between the valve seat and stop approximately $\frac{1}{10}$ of the diameter of the passageway controlled by the valve. The valve will still operate satisfactorily up to an opening movement of $\frac{1}{6}$ of the passage diameter after which further wear occurs very rapidly, resulting in the ultimate destruction of the valve. When the valve is new, I allow it to open only approximately $\frac{1}{10}$ of the passage diameter. Wear of the valve seat and stop eventually increases the opening to about $\frac{1}{6}$ of the passage diameter during the normal life of the pump, which is greater than the life of any automobile engine to which it is likely to be applied.

In case the wear should be excessive after extreme length of use, it is desirable to provide some means to prevent further wear on the stop. I accomplish this function by making the spring 67 of a sufficient number of turns so that it will go solid when the valve opening reaches approximately $\frac{1}{6}$ of the passage diameter, so that the opening of the valve cannot have become so great as to result in destruction of the valve due to the inertia which it would acquire in opening a substantial distance. It will be understood that the valve is opened by the flow of liquid and that the first part of the liquid flow is comparatively slow and gentle, so that by snubbing the valve movement during this part of the cycle, it is not subjected to the greater acceleration which it would acquire during the latter part of the impulse of fuel flow.

One very important function of the inlet valve is to permit free flow of fuel or vapor into the pump chamber during cranking of the engine, but to definitely restrict the flow of fuel into the pump chamber during the intake stroke, so as to produce a short period of low pressure in the pump chamber to lower the boiling point of the fuel, to cause some boiling in the pump chamber under incipient boiling conditions, whereby the lowered temperature resulting from partial vaporization of fuel in the pump chamber will be transmitted to the walls of the valve body to the fuel entering at the connection 25.

In operation, the lever 6 is held in the position shown in Figure 1 by means of the spring 17, so that one end rests on the cam 4, which preferably rotates in a clockwise direction. Turning the cam rocks the lever on the pivot shaft 7 which floats in the bearings 8 and 11. Assuming there is no pressure in the passage outlet, the spring 38 moves the diaphragm 21 to the position shown in Figure 1 until it is withdrawn by contact of the hammer 12 with the hammer pad or shock absorber 35—36—37.

The first part of the intake stroke of the diaphragm occurs rather slowly, due to the changing movement of the cam, and during this part of the movement, the intake valve 54 is opened to the full extent permitted by the stop 69. As the cam continues in its movement, the diaphragm 21 moves more rapidly, and the valve is firmly held in contact with the stop. This somewhat restricts the movement of the liquid during the central part of the stroke, and produces a sharp pressure drop in the pump chamber. The diaphragm or pump chamber 42 is eventually filled due to the dwell at the end of the stroke, and also due to the fact that this chamber is not emptied at each stroke except under very low speed operating conditions. In other words, the cycle of fuel flow lags slightly behind the cycle of diaphragm operation and some vapor will appear in the pump chamber during incipient boiling conditions. During the next cycle of cam movement, which is somewhat less than 180°, if the rotation of the cam is clockwise, the hammer 12 is out of contact with the hammer pad (except during some cranking or vapor locking conditions), and the spring 38 returns the diaphragm 21 to discharge the fuel and any vapor past the exhaust valve. This valve functions in substantially the same way as the intake valve 54, although its movement against the stop does not tend to occur with such great violence, the spring 38 having limited force while the movement of the cam and hammer is substantially positive. The valve also serves as a restriction on the amount of fuel discharged, so as to limit the gallons per hour which the diaphragm can be called on to pump, but without placing any corresponding limit on the amount of vapor which can be pumped to get rid of a vapor locking condition. The pump diaphragm is accordingly available to pump at least ten times as much volume of vapor as it will of liquid fuel.

The device according to this invention departs substantially from prior practice in the restriction at the inlet valve and at the exhaust valve. The inlet restriction definitely limits or reduces the internal suction which can be placed on the fuel at the inlet side of the valve. The amount of suction on the fuel in the pump chamber on the other side of the restriction is increased, but the formation of vapor in the pumping chamber, if it occurs, does not appear to give any serious trouble, but on the contrary, its formation has a cooling action which is helpful in preventing the development of vapor lock. The diaphragm is capable of discharging the vapor at each stroke and it is not allowed to accumulate. This is because of the selective action of the restricted valve in passing vapor more freely than liquid fuel. Any vapor which forms in the inlet air dome may accumulate, so that the elasticity of the large volume of accumulated vapor would become a serious factor, if not withdrawn by a full stroke of the diaphragm, but the vapor forming in the dome and chamber is mostly disposed of at the end of the stroke and cannot accumulate to do serious damage. Since both inlet and exhaust valves have a very selective action in passing a greater volume of vapor than of fuel, it is practically impossible to vapor lock the pump, and yet the diaphragm is not subjected to sever stresses or required to operate through more than a small fraction of its stroke during normal or high speed operation.

The invention may be modified in various respects as will occur to those skilled in the art and the exclusive use of all modifications as come within the scope of the appended claim is contemplated.

I claim:

A valve comprising a body member having a substantially cylindrical opening, a ring-shaped stop member concentric with said opening and open at its top, spaced struts connecting said members, said stop member having a central recess forming a spring seat portion, a valve seat member having a fluid passage therethrough and an annular seat portion, a conical face pressed into said body and extending through said fluid opening and beyond said body to provide for wear of the seat, whereby the wear increases the opening area between the struts in a direction between the seat and said ring-shaped stop member, a thin flat non-metallic disk valve of hard plastic material on a cloth base and of low inertia character, having a plane surface for initial line contact with said seat, said valve being mounted between the seat and the stop, whereby the fluid pressure acts through the stop directly on the valve in a closing direction, said valve having an initial line contact with said annular seat portion, said stop member and said seat being so spaced with respect to the thickness of said valve as to limit the opening movement prior to wear of said seat to not more than ten per cent of the inside diameter of the fluid passage.

IRVEN E. COFFEY.

REFERENCES CITED

The following references are of record in the file of this patent:

UNITED STATES PATENTS

| Number | Name | Date |
| --- | --- | --- |
| 1,014,178 | Roberts | Jan. 9, 1912 |
| 1,551,697 | Richardson | Sept. 1, 1925 |
| 1,695,534 | Carter | Dec. 18, 1928 |
| 1,938,418 | Evans | Dec. 5, 1933 |
| 1,948,676 | Riek | Feb. 27, 1934 |
| 1,959,644 | Richardson | May 22, 1934 |
| 1,976,849 | Hewitt | Oct. 16, 1934 |
| 2,082,512 | Richardson | June 1, 1937 |
| 2,100,805 | Hufford | Nov. 30, 1937 |
| 2,216,622 | Miller | Oct. 1, 1940 |
| 2,392,234 | Downey | Jan. 1, 1946 |